J. MIHALYI.
OPTICAL INSTRUMENT.
APPLICATION FILED APR. 19, 1916.
1,249,163.
Patented Dec. 4, 1917.
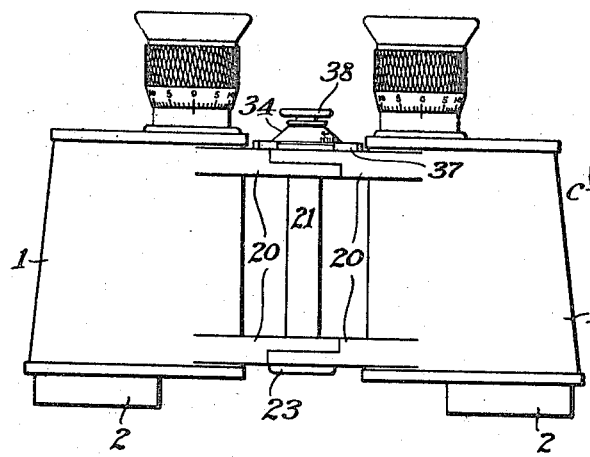
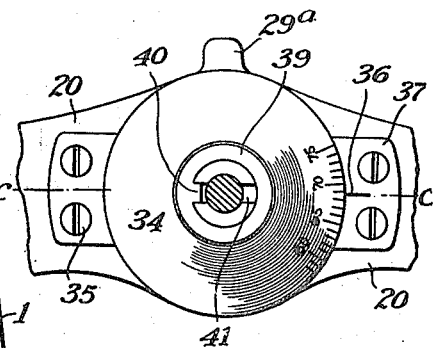
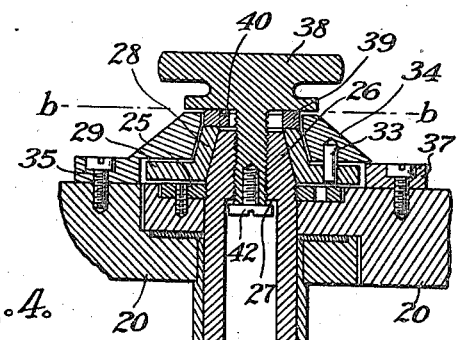
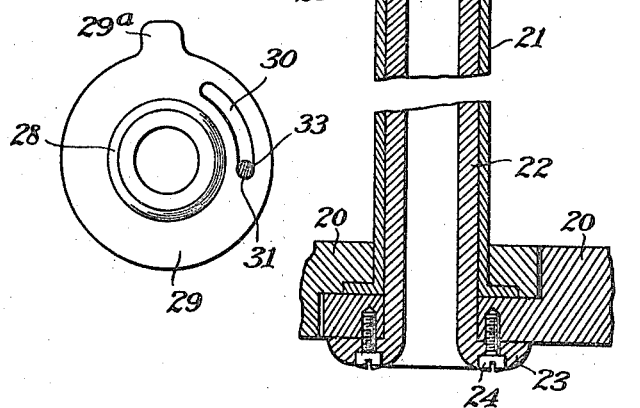
Inventor:
Joseph Mihalyi
By Davis & Simms
his attorneys

UNITED STATES PATENT OFFICE.

JOSEPH MIHALYI, OF ROCHESTER, NEW YORK, ASSIGNOR TO CROWN OPTICAL COMPANY, OF ROCHESTER, NEW YORK, A CORPORATION.

OPTICAL INSTRUMENT.

1,249,163.  Specification of Letters Patent.  Patented Dec. 4, 1917.

Application filed April 19, 1916. Serial No. 92,287.

*To all whom it may concern:*

Be it known that I, JOSEPH MIHALYI, a subject of the Emperor of Austro-Hungary, and resident of Rochester, in the county of Monroe and State of New York, have invented certain new and useful Improvements in Optical Instruments, of which the following is a specification.

The present invention relates to optical instruments and an object of the invention is to provide a binocular telescope, of the type having pivotally connected casings, with an improved stop mechanism for limiting the relative swinging of the casings to correspond with the pupilary distance between the eyes of the user.

To these and other ends, the invention consists of certain parts and combinations of parts all of which will be hereinafter described, the novel features being pointed out in the appended claims.

In the drawings:—

Figure 1 is a plan view of binocular telescopes constructed in accordance with the present invention;

Fig. 2 is a section on the line b—b, Fig. 5;

Fig. 3 is a section on the line c—c, Fig. 4; and

Fig. 4 is a detailed view of the adjustable stop device.

Referring more particularly to the drawings, 1 indicates the casings of which there are two, each of which is provided with an objective mounting 2 and an eyepiece not shown optically connected to the objective in any suitable manner.

The casings 1 are hinged together so that they may be folded in a carrying case and be made to correspond to the pupilary distance between the eyes of the user. In this instance, each casing member is provided with a pair of arms 20 which have their outer ends recessed so that the arms on one member will snugly fit the arms on the other member. The arms on one member are connected by a tubing or sleeve 21 while the arms on the other member are connected by a tubular member 22, which has one end 23 flanged and secured to one of the arms by bolts or screws 24. The other end of this tubular member is secured to the other arm by a nut 25 which engages a screw threaded portion on the tubular member, and beyond the nut the tubular member is provided with a tapered portion 26, this tapered portion having an internally threaded bore of smaller diameter than the other portion of the tube to provide an internal shoulder 27.

Surrounding the projecting, tapering portion 26, is a device having a tapered portion 28 for coöperation with the tapered portion 26, and a flanged portion 29 formed with a slot 30 concentric with the swinging axis of the two casings, one end 31 of the slot forming a stop shoulder to determine the swinging movement of the casings in one direction. For coöperation with the stop shoulder 31, a stop shoulder 32 is provided preferably in the form of a pin 33 which depends from the under side of an overhanging dial ring 34 to operate in the slot 30, the dial ring being secured at 35 by a screw to an arm 20 on that casing member which carries the sleeve 21, and an index 36 being provided for coöperation with the dial on a plate 37 secured to an arm 20 on the casing member which carries the tubular member 22. An arm 29ª on the stop carrying device permits the stop 31 to be adjusted to any desired position.

To effect binding action between the device which carries the stop 31 and the tapered end 26 of the tubular member 22, a clamping head 38 in the form of a thumb screw engaging within the internally threaded bore of the tubular member 22 coöperates with the washer 39 which, by a projection 40 entering a notch 41 in the tubular member, is held against turning relatively to the tubular member. This washer bears against the upper end of the tapered portion 28 and forces the latter firmly into engagement with the tapered portion 26 of the tubular device 22. A screw 42 in the end of the clamping head 39 coöperates with the shoulder 27 to prevent removal of the clamping head.

For setting the adjustable stop 30 to conform to the pupilary distance between the eyes of the user, the clamping screw or head 38 is turned to reduce the pressure on the tapered portion 26 by the tapered portion 28. The two casings are then turned so that the index 36 registers with the proper division on the indicator 34, after which the stop 31 is shifted by the finger piece 29ª until it engages the stop 33 when the clamping head 38 is turned to press the ring 39 against the tapered portion 28, thereby binding said portion 28 against the tapered portion 26 of the tubular member 22, thus locking the stop 31 in the position of use for the individual for whom the adjustment is made. The casings may be swung freely in the other direction in order to be foldably received within their case.

Binoculars constructed in accordance with this invention are provided with a simple and effective stop mechanism which is adjustable readily to correspond with the pupilary distance between the eyes of the user.

What I claim as my invention and desire to secure by Letters Patent is:—

1. A binocular telescope comprising a pair of pivotally connected casings, a stop carrying device adapted to enter into frictional engagement with one of said casings, a clamping member for producing such frictional engagement, and an indicating ring supported by the other of said casings to cover said stop carrying device and carrying a stop movable with the casing into and out of coöperation with the stop on the stop carrying device.

2. A binocular telescope comprising a pair of casings, each having a pair of arms, a tube connecting the arms on one casing, a member connecting the arms of the other casing and extending through said tube, said member having a tapered portion, a device coöperating with said tapered portion and carrying a stop shoulder, a device for effecting binding engagement between said tapered portion and said shoulder carrying device, and a stop arranged to move with the other casing member to coöperate with the stop on said device.

3. A binocular telescope comprising a pair of pivotally connected casings, a tapered portion carried by one casing, a stop carrying device surrounding said tapered portion and carrying a stop, a clamping member for drawing said device into engagement with the tapered portion, and an indicator ring supported by the other casing surrounding said device and carrying a stop for engaging with the stop on the said stop carrying device.

4. A binocular telescope comprising a pair of pivotally connected casings, a tapered portion carried by one casing, a stop carrying device having a tapered portion coöperating with the first named tapered portion, and also having a slotted portion concentric with the axis of turning of said casings one end of the slot serving as a stop, a clamping member for drawing the two tapered portions together, and an indicator ring carried by the other casing about the stop carrying device and carrying a stop to work in said slot.

5. A binocular telescope comprising a pair of casings, each having a pair of arms, a sleeve connecting the arms of one casing, a tube extending through said sleeve and connecting the arms of the other casing, one end of the tube projecting from the sleeve and having a tapered portion, a stop carrying device having a stop thereon, and also having a tapered portion coöperating with the tapered portion of the tube, a clamping screw coöperating with the tube and the stop carrying device to bring them into binding engagement, an indicator ring secured to an arm of the casing member that has its arms connected by the sleeve, said indicator ring being arranged about the clamping screw, and a stop on the last named casing for coöperating with the stop on the stop carrying device.

6. A binocular telescope comprising a pair of casings, a pair of arms on each casing, a sleeve connecting the arms on one casing, a tube extending through the sleeve and connecting the arms on the other casing, said tube having a tapered projecting end, a stop carrying device having a tapered portion coöperating with the tapered portion of the tube, and a slotted portion, one end of the slot forming a stop, a clamping screw engaging one end of the tube and acting to draw the stop carrying device and the tapered end of the tube together, and an indicating ring surrounding the said stop carrying device and having a stop thereon operating in the slot of the stop carrying device.

JOSEPH MIHALYI.

Copies of this patent may be obtained for five cents each, by addressing the "Commissioner of Patents, Washington, D. C."

It is hereby certified that in Letters Patent No. 1,249,163, granted December 4, 1917, upon the application of Joseph Mihalyi, of Rochester, New York, for an improvement in "Optical Instruments," errors appear in the printed specification requiring correction as follows: Page 1, line 26, for the abbreviation and numeral "Fig. 5" read *Fig. 3;* same page, line 28, for "Fig. 4" read *Fig. 2;* and that the said Letters Patent should be read with these corrections therein that the same may conform to the record of the case in the Patent Office.

Signed and sealed this 15th day of January, A. D., 1918.

[SEAL.]                                R. F. WHITEHEAD,

*Acting Commissioner of Patents.*

Cl. 88—34.